United States Patent
Ding et al.

(10) Patent No.: US 8,712,240 B2
(45) Date of Patent: Apr. 29, 2014

(54) OPTICAL POWER MEASUREMENT METHOD, OPTICAL LINE TERMINAL AND OPTICAL NETWORK UNIT

(75) Inventors: Ping Ding, Shenzhen (CN); Yinghua Dong, Shenzhen (CN); Xuanqin Liang, Shenzhen (CN); Guangdong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 13/250,773

(22) Filed: Sep. 30, 2011

(65) Prior Publication Data

US 2012/0020662 A1  Jan. 26, 2012

Related U.S. Application Data

(63) Continuation of application No. PCT/CN2010/071470, filed on Mar. 31, 2010.

(30) Foreign Application Priority Data

Mar. 31, 2009 (CN) .......................... 2009 1 0106430

(51) Int. Cl.
*H04J 14/00* (2006.01)
(52) U.S. Cl.
USPC .............. 398/66; 398/67; 398/35; 398/38; 398/98
(58) Field of Classification Search
USPC ........... 398/38, 66, 67, 68, 70–72, 74, 75, 98, 398/25, 154, 58, 165, 35, 52
See application file for complete search history.

(56) References Cited

U.S. PATENT DOCUMENTS 6,023,467 A * 2/2000 Abdelhamid et al. ..... 370/236.2
6,636,527 B1 * 10/2003 Lee et al. .................... 370/465
(Continued)

FOREIGN PATENT DOCUMENTS

CN  1780223 A  5/2006
CN  1790951 A  6/2006
(Continued)

OTHER PUBLICATIONS

Written Opinion of the International Searching Authority dated Jul. 1, 2010 in connection with International Patent Application No. PCT/CN2010/071470.

(Continued)

*Primary Examiner* — Daniel Washburn
*Assistant Examiner* — Hibret Woldekidan

(57) ABSTRACT

The embodiments of the present invention relate to communications technology, and disclose an optical power measurement method, an Optical Line Terminal (OLT), and an Optical Network Unit (ONU). The method includes: generating a Physical Layer Operation Administration Maintenance (PLOAM) message that includes an identifier of at least one ONU to be measured and information about a time bucket that is allocated to the ONU to be measured and is used for sending upstream optical signals; sending the PLOAM message to the multiple ONUs; receiving the upstream optical signals that are sent, in the allocated time bucket, by the ONU to be measured; and detecting the received upstream optical signals, and determining the optical power of the upstream optical signals. The present invention avoid waste of bandwidth caused in the prior art when the DBA is required to allocate bandwidth to the ONU to be measured for the purpose of detecting the optical power.

5 Claims, 3 Drawing Sheets

(56) References Cited

U.S. PATENT DOCUMENTS

| | | | |
|---|---|---|---|
| 6,647,210 B1* | 11/2003 | Toyoda et al. | 398/102 |
| 6,778,557 B1* | 8/2004 | Yuki et al. | 370/468 |
| 7,428,249 B2* | 9/2008 | Diaconescu et al. | 370/509 |
| 7,773,880 B2* | 8/2010 | Sakamoto et al. | 398/72 |
| 7,991,296 B1* | 8/2011 | Johnston et al. | 398/154 |
| 8,254,292 B2* | 8/2012 | Ikeda et al. | 370/254 |
| 8,320,760 B1* | 11/2012 | Lam et al. | 398/66 |
| 8,406,633 B1* | 3/2013 | Johnston et al. | 398/154 |
| 2002/0057697 A1* | 5/2002 | Yamamori et al. | 370/395.2 |
| 2002/0085583 A1* | 7/2002 | Kasa et al. | 370/449 |
| 2005/0041682 A1* | 2/2005 | Kramer | 370/458 |
| 2007/0023615 A1 | 2/2007 | Ruegg et al. | |
| 2007/0098406 A1* | 5/2007 | Bernard et al. | 398/72 |
| 2007/0140689 A1* | 6/2007 | Haran | 398/27 |
| 2007/0230958 A1* | 10/2007 | Jiang et al. | 398/72 |
| 2007/0237523 A1* | 10/2007 | Miguel et al. | 398/71 |
| 2007/0268759 A1 | 11/2007 | Sabino et al. | |
| 2009/0067850 A1* | 3/2009 | Mizutani et al. | 398/154 |
| 2009/0080888 A1* | 3/2009 | Sugawara et al. | 398/61 |
| 2009/0226170 A1* | 9/2009 | Zou | 398/79 |
| 2009/0263130 A1* | 10/2009 | Luo et al. | 398/58 |
| 2011/0211827 A1* | 9/2011 | Soto et al. | 398/25 |
| 2011/0236017 A1* | 9/2011 | Ohlen | 398/34 |
| 2012/0045207 A1* | 2/2012 | Luo et al. | 398/58 |
| 2012/0141139 A1* | 6/2012 | Bakhru et al. | 398/158 |
| 2012/0177361 A1* | 7/2012 | Hirano et al. | 398/1 |

FOREIGN PATENT DOCUMENTS

| | | |
|---|---|---|
| CN | 101047442 A | 10/2007 |
| CN | 101047450 A | 10/2007 |
| CN | 101060369 A | 10/2007 |
| CN | 101127567 A | 2/2008 |
| WO | WO 2008/030319 A2 | 3/2008 |

OTHER PUBLICATIONS

Supplementary European Search Report dated Dec. 20, 2011 in connection with European Patent Application No. EP 10 75 8056.

"Series G: Transmission Systems and Media, Digital Systems and Networks, Digital sections and digital line system—Optical line systems for local and access networks, Gigabit-capable Passive Optical Networks (G-PON): Transmission convergence layer specification", ITU-T G984.3, Mar. 2008, 142 pages.

International Search Report dated Jul. 1, 2010 in connection with International Patent Application No. PCT/CN2010/071470.

Partial translation of Office Action dated Mar. 4, 2013 in connection with Chinese Patent Application No. 200910106430.0.

Communication pursuant to Article 94(3) EPC dated Mar. 21, 2013 in connection with European Patent Application No. 10 758 056.5.

* cited by examiner

OPTICAL POWER MEASUREMENT METHOD, OPTICAL LINE TERMINAL AND OPTICAL NETWORK UNIT

CROSS-REFERENCE TO RELATED APPLICATIONS

This application is a continuation of International Application No. PCT/CN2010/071470, filed on Mar. 31, 2010, which claims priority to Chinese Patent Application No. 200910106430.0, filed on Mar. 31, 2009, both of which are hereby incorporated by reference in their entireties.

TECHNICAL FIELD

The present invention relates to the field of communications technologies, and in particular, to an optical power measurement method, an Optical Line Terminal (OLT), and an Optical Network Unit (ONU).

BACKGROUND

With the gradual decrease of optical transmission costs, it is an evitable development trend that the access network will be based on fibers. The access network segment that represents the "last mile" is required to be characterized by ultra-low costs, simple structure, and easy implementation, which brings great challenges to technical implementation. A Passive Optical Network (PON) employs passive components, and is the most potential technology for implementing broadband optical access network.

PONS are generally composed of an OLT located at the central office and a series of ONUs located at the customer premises. An Optical Distribution Network (ODN) composed of fibers and passive optical splitter or coupler exists between the central office and the customer premises. This mode makes multiple users share the relatively expensive fiber link from the central office to the customer premises, which greatly reduces the cost of implementing Fiber To The Building (FTTB) and Fiber To The Home (FTTH).

Therefore, it is essential to monitor and maintain the fiber link between the OLT at the central office and the ONU at the customer premises. In practice, a mode of monitoring and maintaining the fiber link is: The ONU at the customer premises sends a burst optical signal to the OLT at the central office, and the OLT at the central office receives the burst optical signal and measures the power of the burst optical signal, and then analyzes and monitors the performance of the fiber link between the OLT and the ONU according to the power value of the burst optical signal.

When the OLT measures the power of the burst optical signal sent by the ONU, the OLT needs to first sample current mirrors for the optical current corresponding to the burst optical signal sent by the ONU to obtain the mirrored current of the optical current, convert the mirrored current into voltage, hold the samples of voltage, use an Analog-to-Digital Converter (ADC) to convert the held voltage to digital signals, and calculate optical power. Normally, it takes about 100 us to finish the process from sampling the optical current to calculating out the optical power value. In the time of 100 us, the ONU must continuously send optical signals in order to eventually obtain the high-precision optical power value. To ensure the ONU to keep sending the burst optical signals for a certain period such as 100 us, the OLT needs to allocate a wide bandwidth to the ONU that is to be measured. The wide bandwidth, for example, at least 100 us, is relatively wide as against the timeslot for the ONU to send data normally. In the process of allocating wide bandwidth to the ONU that is to be measured, it is required that a Dynamic Bandwidth Assignment (DBA) module adjusts bandwidth for all ONUs in order to allocate a wide bandwidth to the ONU that is to be measured.

In the research process, the inventor of the present invention finds that when the DBA module of the OLT assigns bandwidth to the ONU, a certain update period exists. That is, the DBA module does not update or adjust the bandwidth occupied by each ONU in each frame until every m frames have elapsed, where m is an integer greater than 1 and is generally an integer multiple of 2. As shown in FIG. 1, the update period of the DBA is 8 frames. In non-measurement periods, the bandwidth occupied by ONU1 in one frame (125 us) is only M us, for example, M=25. ONU1 transmits data in the 25 us time. For the purpose of measuring the Received Signal Strength Indicator (RSSI) for ONU1, a bandwidth of a continuous time bucket needs to be allocated to ONU1 and the continuous time bucket is greater than the 25 us in each frame (125 us), for example, bandwidth of at least 100 us. In order for the DBA module to allocate bandwidth of at least 100 us to ONU1, the bandwidth occupied by other ONUs in the same OLT will decrease accordingly. The bandwidth occupied by each ONU keeps unchanged in an update period of a DBA, namely, the DBA allocates bandwidth of at least 100 us to ONU1 in each frame in an update period of the DBA. Therefore, only the remaining bandwidth in each frame is available to other ONUs in the update period of the DBA. As shown in FIG. 1, during the period of measuring the RSSI, within an update period (8 frames) of the DBA, ONU1 occupies at least 100 us in each frame. In practice, it takes only 100 us to measure the optical power. That is, the bandwidth allocated in the first frame within an update period of the DBA can meet the requirement of measurement; the other 7 frames do not need to perform measurement of optical power, and are used for transmitting the data normally; but ONU1 requires bandwidth of only 25 us during the time of transmitting data normally. Therefore, within an update period of the DBA, ONU1 wastes bandwidth of at least 75 us*7=525 us; and the percentage of the wasted bandwidth is 525 us/(125 us*8) =52.5%, but the bandwidth required by other ONUs is not satisfied. In the prior art, the method that the DBA module is used for allocating wide bandwidth to the ONU that is to be measured for the purpose of measuring burst optical power causes tremendous waste of bandwidth and affects the work of other ONUs.

SUMMARY

A method for measuring optical power is provided in an embodiment of the present invention. The method is applied to a Gigabit Passive Optical Network (GPON) that includes an OLT and multiple ONUs. The method includes:

generating a Physical Layer Operation Administration Maintenance (PLOAM) message which is carried in a PLOAM field of a downstream PLOAM (PLOAMd) overhead area in a downstream frame of a GPON Transmission Convergence layer (GTC), where: the PLOAM message includes an identifier of an ONU that is to be measured among multiple ONUs and information about a time bucket for sending upstream optical signals, and the time bucket is allocated to the ONU to be measured so that the ONU to be measured sends the upstream optical signals to the OLT in the time bucket and other ONUs in the multiple ONUs do not send the upstream optical signals to the OLT in the time bucket;

sending the PLOAM message from the OLT to the multiple ONUs; and receiving the upstream optical signals sent in the allocated time bucket by the ONU to be measured, detecting the received upstream optical signals, and determining optical power of the upstream optical signals.

An OLT provided in an embodiment of the present invention includes:

a GPON Transmission Convergence layer (GTC) module (43), configured to: generate a PLOAM message which is carried in a PLOAM field of a PLOAMd overhead area in a downstream frame of a GTC layer, where: the PLOAM message includes an identifier of an ONU to be measured among multiple ONUs and information about a time bucket for sending upstream optical signals, and the time bucket is allocated to the ONU to be measured so that the ONU to be measured sends the upstream optical signals to the OLT in the time bucket and other ONUs in the multiple ONUs do not send the upstream optical signals to the OLT in the time bucket;

a sending module, configured to send the PLOAM message to the multiple ONUs; and a detecting module, configured to: receive the upstream optical signals sent in the time bucket by the ONU to be measured, detect the received upstream optical signals, and determine optical power of the upstream optical signals.

An ONU provided in an embodiment of the present invention includes a GPON Transmission Convergence layer (GTC) module (51), a control module (52), and an optical module (53).

The GTC module 51 is configured to: receive and parse a PLOAM message from an OLT, obtain from the PLOAM message an identifier of an ONU to be measured and information about a time bucket for sending upstream optical signals, where the time bucket is allocated by the OLT to the ONU to be measured, and the PLOAM message is carried in a PLOAMd field of a downstream Physical-layer Control Block (PCBd) overhead area in a GPON downstream frame;

The control module (52) is configured to judge whether its own identifier matches the identifier of the ONU to be measured; and control the optical module (53) to send the upstream optical signals in the time bucket if its own identifier matches the identifier of the ONU to be measured, or control the optical module (53) to send no upstream optical signal in the time bucket if its own identifier does not match the identifier of the ONU to be measured.

A PON is provided in an embodiment of the present invention. The PON includes an OLT (61) and multiple ONUs. The multiple ONUs are connected to the OLT (61) through an ODN (62).

The OLT (61) sends a PLOAM message to multiple ONUs (63) through the ODN (62). The PLOAM message is carried in a PLOAMd field in a GPON downstream frame, the PLOAM message carries an identifier of an ONU to be measured and information about a time bucket for sending upstream optical signals, and the time bucket is allocated to the ONU to be measured so that the ONU to be measured sends in the time bucket the upstream optical signals to the OLT and other ONUs in the multiple ONUs do not send the upstream optical signals to the OLT in the time bucket.

The OLT (61) is further configured to receive the upstream optical signals sent, according to the time bucket information carried in the PLOAM message, by the ONU to be measured, detect the received upstream optical signals, and determine optical power of the upstream optical signals.

Each ONU (63) in the multiple ONUs is configured to: receive and parse the PLOAM message from the OLT (61), obtain the identifier of the ONU to be measured and the information about a time bucket that is allocated to the ONU to be measured and is used for sending upstream optical signals; determine whether its (namely, ONU (63)) own identifier matches the identifier of the ONU to be measured, send the upstream optical signals to the OLT (61) in the time bucket if the identifier of the ONU to be measured matches the identifier of this ONU (63), or send no upstream optical signal to the OLT 61 in the time bucket if the identifier of the ONU to be measured does not match the identifier of this ONU (63).

It can be known that, in the embodiments of the present invention, a time bucket is allocated to the ONU to be measured through the GTC module of the OLT; the information about the time bucket is sent, through a PLOAM message, to the ONU that is to be measured; after receiving the PLOAM message, the ONU to be measured learns the time bucket allocated to the ONU, and sends upstream optical signals in the time bucket to enable the OLT to measure the burst optical power. It can be known that, in the technical solutions provided by the present invention, the DBA module is not required to allocate bandwidth to the ONU to be measured for the purpose of measuring the upstream burst optical power of the ONU, and therefore update of the bandwidth occupied by each ONU is not required either; instead, a time bucket is directly allocated to the ONU that is to be measured; in the upstream frame of this time bucket, the ONU to be measured occupies a relatively wide bandwidth; in other upstream frames, the ONUs still transmit data according to the existing bandwidth allocation scheme of the DBA module, which avoids waste of bandwidth and does not affect the work of other ONUs. In addition, when the optical power of the fiber link is measured according to the technical solutions provided by the present invention, the measurement is simple, flexible, and highly operable without involving any DBA module.

BRIEF DESCRIPTION OF THE DRAWINGS

The drawings described below are provided to enable thorough understanding of the present invention, and are part of this application but shall not be construed as limitation on the present invention.

DETAILED DESCRIPTION

To make those skilled in the art understand the present invention and better implement the present invention, the following describes the embodiments of the present invention with reference to accompanying drawings. The exemplary embodiments of the present invention and the description of the present invention are used to illustrate the present invention, and shall not be construed as limitation on the present invention.

The optical power measurement method provided by an embodiment of the present invention is applied to a GPON which includes an OLT and multiple ONUs and communicates in a Point-to-MultiPoint (P2MP) mode. In the method, optical power of the ONU is measured through the OLT, which provides a basis for analyzing the performance of the link between the OLT and the ONU to be measured.

Figure 1:
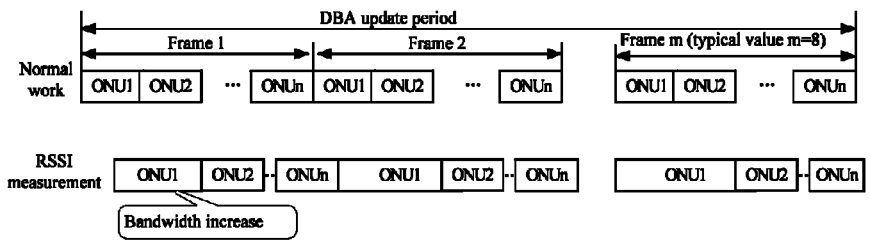
FIG. 1 is a schematic diagram showing how a DBA module allocates bandwidth to an ONU to be measured in the prior art.
Figure 2:
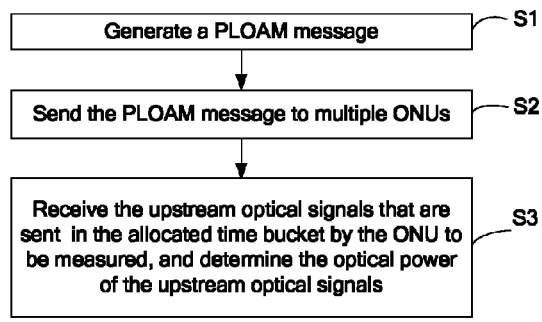
FIG. 2 is a flow chart of an optical power measurement method according to an embodiment of the present invention.

As shown in FIG. 2, an optical power measurement method in an embodiment of the present invention includes the following steps:

Step S1: Generate a PLOAM message.

When the OLT initiates measurement of the received optical power for at least an ONU (namely, ONU to be measured) on the ONU side, a power measurement command module 42 in the OLT generates a burst optical power measurement command that carries an identifier of the ONU to be measured. After receiving the burst optical power measurement command, a GTC module 43 in the OLT allocates, according to the identifier of the ONU to be measured in the command, a time bucket, which is used for sending upstream optical signals, to the ONU that is to be measured, and encapsulates the identifier of the ONU to be measured and the information about the time bucket allocated to the ONU to be measured into a PLOAM message. In this way, the PLOAM message is generated.

The information about the time bucket may include start time of the time bucket, end time of the time bucket, and length of the time bucket, or any two of them. The length of the time bucket is not limited herein. Generally, the length of the time bucket may be set to be a frame, namely, 125 us. If the length of the time bucket is less than 125 us, the precision of measuring optical power may be affected. If the length of the time bucket is greater than 125 us, the precision of measuring the optical power is increased, but the data transmission of other ONUs in the next frame will be affected.

Figure 3:
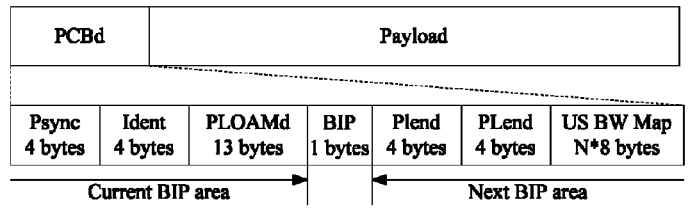
FIG. 3 shows a structure of a GPON downstream frame.

It should be noted that the PLOAM message is carried in a PLOAMd field in a downstream frame of the GPON. FIG. 3 shows a structure of a GPON downstream frame. The GPON downstream frame includes a PCBd overhead area and a data payload area. The PCBd overhead area includes a Physical Synchronization (PSync) field, a superframe indication (Ident) field, a PLOAMd field, a Bit Interleaved Parity (BIP) field, a downstream Payload Length (PLend) field, and an Upstream Bandwidth Map (US BW Map) field. In this embodiment, the PLOAM message carried in the PLOAMd field of the PCBd overhead area in the downstream frame of the GPON carries an identifier of an ONU to be measured and information about a time bucket for sending upstream optical signals, and the time bucket is allocated by the OLT to the ONU to be measured, so that the ONU to be measured sends the upstream optical signals to the OLT in the time bucket and that other ONUs in the multiple ONUs do not send the upstream optical signals to the OLT in the time bucket, namely, other ONUs remain silent. The functions of the Psync field, Ident field, BIP field, PLent field, and US BW Map field in the PCBd overhead area are covered in the prior art. For example, the US BW Map field carries information about the bandwidth allocated by the DBA module according to the update period of the DBA, which is not described in detail herein. The service data fragment that is carried based on a GPON Encapsulation Mode (GEM) is included in the data payload area.

Step S2: Send the PLOAM message generated in step S1 to the multiple ONUs.

As described above, the PLOAMd field of the PCBd overhead area in the downstream frame of the GPON bears a PLOAM message, and the PLOAM message carries the identifier of the ONU to be measured and the information about the time bucket that is allocated to the ONU to be measured and is used for sending upstream optical signals. The downstream frame is sent to the multiple ONUs in the GPON.

After receiving the downstream frame, the multiple ONUs parse the downstream frame to obtain the PLOAM message; and obtain from the PLOAM message the identifier of the ONU to be measured and the information about the time bucket that is allocated to the ONU to be measured and is used for sending upstream optical signals. Afterward, each ONU compares its own identifier with the identifier of the ONU to be measured. If its own identifier does not match the identifier of the ONU to be measured, the ONU keeps silent in the time bucket that is allocated by the OLT to the ONU to be measured and is used for sending the upstream optical signals, namely, sends no upstream optical signal to the OLT. If its own identifier matches the identifier of the ONU to be measured, the ONU sends upstream optical signals in the time bucket that is allocated by the OLT to the ONU to be measured and is used for sending upstream optical signals. The upstream optical signals carry the identifier of the ONU, that is, the identifier of the ONU to be measured, so that the OLT may determine the start of the receiving interval and detect the power of the upstream optical signals, after the OLT receives the upstream optical signals.

Step S3: Receive the upstream optical signals sent by the ONU, which is to be measured, in the time bucket that is allocated by the OLT and is used for sending the upstream optical signals, and determine the optical power of the upstream optical signals.

After the multiple ONUs receive the PLOAM message, each ONU obtains the identifier of the ONU to be measured and the information about the time bucket that is allocated to the ONU to be measured and is used for sending the upstream optical signals in the PLOAM message. Afterward, each ONU compares its own identifier with the identifier of the ONU to be measured. If its own identifier does not match the identifier of the ONU to be measured, the ONU keeps silent in the time bucket that is allocated by the OLT to the ONU to be measured and is used for sending the upstream optical signals, namely, sends no upstream optical signal to the OLT. If its own identifier matches the identifier of the ONU to be measured, it indicates that the ONU is the ONU to be measured, and the ONU sends upstream optical signals in the time bucket that is allocated by the OLT to the ONU to be measured and is used for sending the upstream optical signals. The upstream optical signals carry the identifier of the ONU, that is, the identifier of the ONU to be measured.

The OLT receives the upstream optical signals sent by the ONU to be measured, and detects the identifier of the ONU carried in the upstream optical signals. If it is detected that the identifier in the upstream optical signals matches the identifier of the ONU to be measured, the OLT determines the start of the receiving interval, determines the length of the receiving interval according to the time bucket that is allocated by the OLT to the ONU to be measured and is used for sending the upstream optical signals, and detects, in the receiving interval, the upstream optical signals sent by the ONU to be measured. Afterward, the OLT determines the optical power of the upstream optical signals according to the detected upstream optical signals.

In the foregoing process, the ONU to be measured may keep sending the optical signals for a certain period (such as 100 us) in the foregoing time bucket (such as 125 us), but the period cannot exceed the length of the time bucket that is allocated by the OLT to the ONU to be measured and is used for sending the upstream optical signals. In the time bucket allocated by the OLT, the ONU to be measured may send optical signals at any time, but the end time of the optical signals cannot be later than the end time of the foregoing time bucket.

After completion of detecting the optical power of the upstream optical signals sent by the ONU to be measured, the performance of the link between the OLT and the ONU to be measured may be analyzed according to the detected optical power value.

In this embodiment, if the OLT measures optical power of the ONU that is to be measured among the multiple ONUs connected to the OLT, the GTC module of the OLT directly allocates a time bucket to the ONU, which is to be measured, for sending the upstream optical signals, and encapsulates into a PLOAM message the identifier of the ONU to be measured and the information about the time bucket that is allocated to the ONU to be measured and is used for sending the upstream optical signals, where the PLOAM message is carried in a PLOAMd field of a GPON downstream frame. The GTC module sends the PLOAM message to the multiple ONUs. Among the multiple ONUs, the ONU whose identifier matches the identifier of the ONU, which is to be measured, in the PLOAM message sends upstream optical signals in the time bucket, and other ONUs keeps silent in the time bucket. The OLT detects the power of the upstream optical signals that are sent in the time bucket by the ONU to be measured. Therefore, in this embodiment, the DBA is not required to allocate a wide bandwidth to the ONU to be measured; instead, the GTC module of the OLT allocates a time bucket to the ONU, which is to be measured, for sending burst upstream optical signals. The ONU to be measured may occupy a relatively wide bandwidth in a frame, but still transmits data according to the bandwidth previously allocated by the DBA in other frames, which avoids waste of bandwidth and does not affect the work of other ONUs. The test process is simple, flexible, and highly operable without involving any DBA module.

Figure 4:
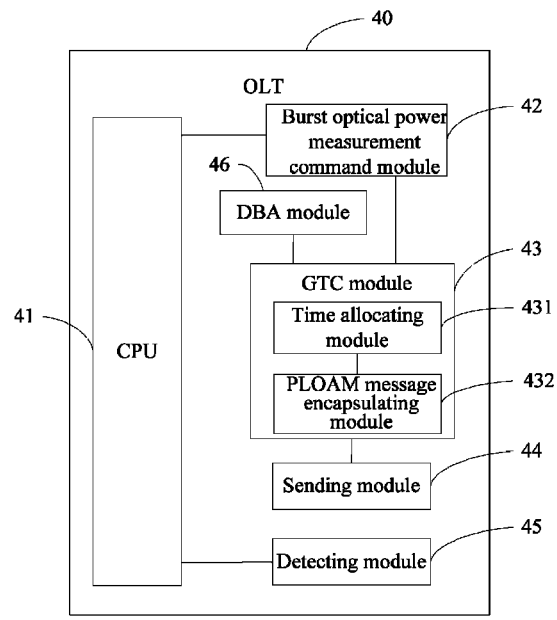
FIG. 4 is a schematic structural diagram of an OLT according to an embodiment of the present invention.

As shown in FIG. 4, a structural diagram of an OLT is provided in an embodiment of the present invention, which includes:

a GPON Transmission Convergence (GTC) module 43, configured to: generate a PLOAM message that is carried in a PLOAMd field of PCBd overhead area in a GPON downstream frame, where: the PLOAM message carries an identifier of an ONU to be measured among multiple ONUs and information about a time bucket for sending upstream optical signals, and the time bucket is allocated to the ONU to be measured, so that the ONU to be measured sends the upstream optical signals to the OLT in the time bucket and other ONUs in the multiple ONUs do not send the upstream optical signals to the OLT in the time bucket, where the GTC module 43 may perform GTC encapsulation to generate a GTC frame, encapsulate the service data segment, which is carried based on a GEM encapsulation mode, into a data payload area of the GTC downstream frame, and encapsulate the PLOAM message into the PLOAMd field of the PCBd overhead area in the GTC frame, where the PLOAM message carries the identifier of the ONU to be measured and the information about the time bucket that is allocated to the ONU to be measured and is used for sending the upstream optical signals;

a sending module 44, configured to send the PLOAM message to multiple ONUs; and a detecting module 45, configured to: receive and detect the upstream optical signals sent by the ONU (the ONU to be measured) whose identifier matches the identifier of the ONU to be measured after the ONU receives and parses the PLOAM message, and determine optical power of the upstream optical signals according to the detected and received upstream optical signals.

The detecting module 45 may detect the optical power of the upstream optical signals sent, in the time bucket, by the ONU to be measured, and the detecting can be implemented in the following way: First, take samples of current mirrors for the optical current corresponding to the upstream optical signals sent by the ONU to be measured, to obtain mirrored current of the optical current, convert the mirrored current into voltage, hold samples of the voltage, use an Analog-to-Digital Converter (ADC) to convert the held voltage into digital signals, and then calculate the optical power.

The OLT 40 may further include a CPU 41 and a command module 42 of burst optical power measurement.

The CPU 41 is configured to initiate measurement of burst optical power for an ONU to be measured at the ONU side, and send the identifier of the ONU to be measured to a power measurement command module 42; and The power measurement command module 42 is configured to generate, according to the identifier of the ONU to be measured, a burst optical power measurement command that includes the identifier of the ONU to be measured, and send the command to the GTC module 43.

The GTC module 43 may include a time assigning module 431 and a PLOAM message encapsulating module 432.

The time allocating module 431 is configured to allocate a time bucket to the ONU to be measured for sending upstream optical signals according to the burst optical power measurement command sent by the power measurement command module 42; and The PLOAM message encapsulating module 432 is configured to encapsulate the identifier of the ONU to be measured and the information about the time bucket into a PLOAM message, where the identifier is included in the burst optical power measurement command, the time bucket is allocated by the time allocating module 431 to the ONU to be measured, and the PLOAM message is carried in a PLOAMd field of a PCBd overhead area in a GPON downstream frame.

The sending module 44 sends the PLOAM message to multiple ONUs through the downstream frame. The sending module 44 may further perform other protocol-layer processing such as GPON Physical Media Dependent (GPM) processing after the GTC frame encapsulation is performed.

After the multiple ONUs receive the PLOAM message, each of the ONU obtains the identifier of the ONU to be measured and the information about the time bucket that is allocated by the OLT to the ONU to be measured and is used for sending upstream optical signals in the PLOAM message. Afterward, each ONU compares its own identifier with the identifier of the ONU to be measured. If its own identifier does not match the identifier of the ONU to be measured, the ONU keeps silent in the time bucket that is allocated by the OLT to the ONU to be measured and is used for sending the upstream optical signals, namely, sends no upstream optical signal to the OLT. If its own identifier matches the identifier of the ONU to be measured, it indicates that the ONU is the ONU to be measured, and the ONU sends upstream optical signals in the allocated time bucket. The upstream optical signals include the identifier of the ONU, that is, the identifier of the ONU to be measured.

The detecting module 45 receives the upstream optical signals sent by the ONU to be measured, and detects the identifier of the ONU carried in the upstream optical signals. If it is detected that the identifier in the upstream optical signals matches the identifier of the ONU to be measured, the OLT determines the start of the receiving interval, determines the length of the receiving interval according to the time bucket that is allocated by the OLT to the ONU to be measured and is used for sending upstream optical signals, detects the upstream optical signals that is received, in the receiving interval, from the ONU to be measured, and determines the optical power of the upstream optical signals.

After detecting the optical power of the upstream optical signals, the detecting module 45 reports the detected optical power value to the CPU 41. The CPU 41 analyzes the performance of the link between the ONU to be measured and the OLT according to the optical power value, for example, analyzes the loss of the fiber link between the ONU to be measured and the OLT, and how the loss of the fiber link between the ONU to be measured and the OLT changes with time.

The OLT may further include a DBA module 46. The DBA module may dynamically allocate and adjust bandwidth for the ONU according to the DBA update period. The information about the bandwidth allocated by the DBA module is carried in a US BW map field of the PCBd overhead area so that the ONU can send data in each of multiple frames in the DBA update period according to the allocated bandwidth. In the prior art, the bandwidth is dynamically allocated and adjusted through the DBA module to update the bandwidth occupied by each ONU. In this way, a relatively wide bandwidth is allocated to the ONU to be measured, the ONU to be measured can keep sending an upstream optical signal for a long period within the wide bandwidth, and the OLT can measure the burst optical power. In this embodiment, however, the GTC module of the OLT directly allocates a time bucket to the ONU, which is to be measured, for sending upstream optical signals, and the DBA module is not required to adjust bandwidth dynamically to update the bandwidth occupied by each ONU. In this way, a wide bandwidth is allocated to the ONU to be measured, which avoids waste of bandwidth.

Figure 5:
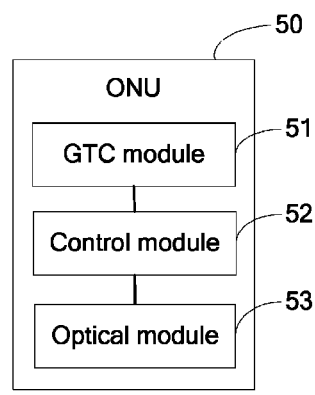
FIG. 5 is a schematic structural diagram of an ONU according to an embodiment of the present invention.

As shown in FIG. 5, an ONU 50 provided in an embodiment of the present invention includes a GTC module 51, a control module 52, and an optical module 53.

The GTC module 51 is configured to receive and parse a PLOAM message from the OLT, to obtain the identifier of the ONU to be measured and the information about the time bucket that is allocated by the OLT to the ONU to be measured and is used for sending upstream optical signals, where the PLOAM message is carried in a PLOAMd field of a PCBd overhead area in a GPON downstream frame;

The control module 52 is configured to judge whether its own identifier matches the identifier of the ONU to be measured and control the optical module 53 to keep silent in the time bucket that is allocated by the OLT to the ONU to be measured and is used for sending the upstream optical signals if its own identifier doesn't match the identifier of the ONU to be measured, or control the optical module to send the upstream optical signals in the time bucket that is allocated by the OLT to the ONU to be measured and is used for sending the upstream optical signals if its own identifier matches the identifier of the ONU to be measured.

The uplink optical signals carry the identifier of the ONU that sends the optical signals (namely, the ONU to be measured), so that after the OLT receives the upstream optical signals, the OLT may determine that the upstream optical signals are the upstream optical signals, which are sent by the ONU to be measured, by identifying the identifier in the upstream optical signals, and may further determine the start of the receiving interval, and receive and detect the power of the upstream optical signals.

Figure 6:
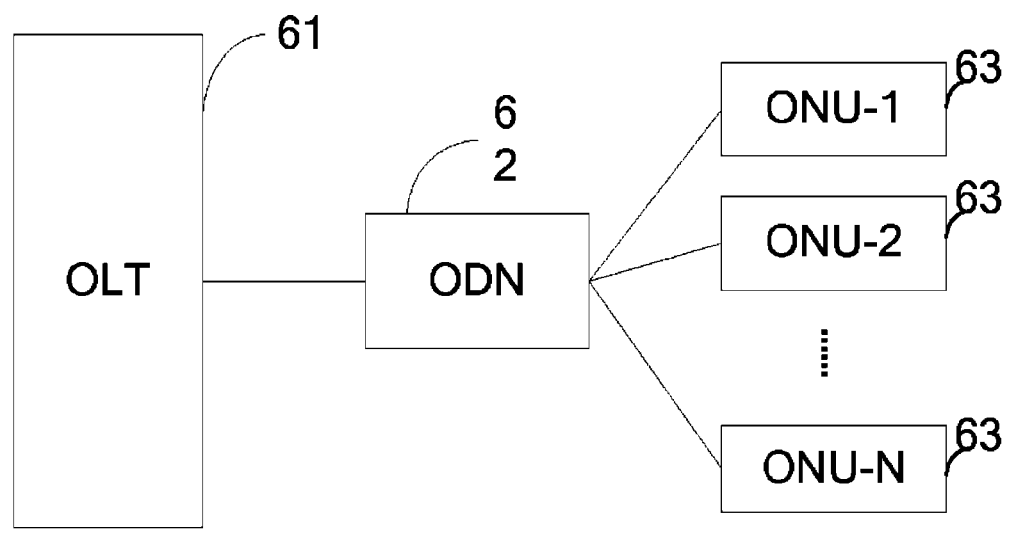
FIG. 6 is a schematic structural diagram of a PON according to an embodiment of the present invention.

A structural diagram of a PON is provided in an embodiment of the present invention. As shown in FIG. 6, the PON includes an OLT 61 and multiple ONUs 63. The multiple ONUs 63 are connected to the OLT 61 through an ODN 62. In FIG. 6, the multiple ONUs are ONU-1, ONU-2, . . . , ONU-N, where N is an integer greater than 2 in the embodiment of the present invention. The structure of the OLT 61 is shown in FIG. 4, and the structure of the ONU 63 is shown in FIG. 5.

The OLT 61 is connected to one end of the ODN 62, and the other end of the ODN 62 is connected to multiple ONUs. The following takes ONU-1 as an example to describe how the OLT measures the burst optical power of the ONU in the network.

Suppose that the OLT 61 initiates measurement of the burst optical power for ONU-1 to analyze the performance of the fiber link between the OLT 61 and ONU-1.

The OLT 61 first allocates to ONU-1a time bucket for sending upstream optical signals, encapsulates the identifier of ONU-1 and information about the time bucket for sending the upstream optical signals into a PLOAM message and generates the PLOAM message, and sends the PLOAM message to N ONUs in FIG. 6. The process of sending the PLOAM message to N ONUs in FIG. 6 is specifically: The OLT 61 first sends the PLOAM message to the ODN 62, and then the ODN 62 distributes the PLOAM message to N ONUs in FIG. 6.

The N ONUs in FIG. 6 receive and parse the PLOAM message that includes the identifier of ONU-1 to be measured and the information about the time bucket that is allocated by the OLT to ONU-1 and is used for sending the upstream optical signals, and obtain the identifier of ONU-1 and the information about the time bucket that is allocated by the OLT to ONU-1 and is used for sending the upstream optical signals. The N ONUs compare their own identifiers with the identifier of ONU-1 respectively. If their own identifiers do not match the identifier of ONU-1, for example, if the identifiers of other ONUs except ONU-1 do not match the identifier of ONU-1, the ONUs keep silent in the time bucket allocated by the OLT 61 to ONU-1, namely, sends no upstream optical signal to the OLT 61. If their own identifiers match the identifier of ONU-1, that is, ONU-1 finds that the identifier included in the PLOAM message is the identifier of ONU-1, ONU-1 sends the upstream optical signals in the time bucket allocated by the OLT to ONU-1.

The upstream optical signals sent by ONU-1 first arrive at the ODN 62, and then the ODN 62 sends the upstream optical signals to the OLT 61.

The OLT 61 receives the uplink optical signals sent by ONU-1, detects power of the uplink optical signals, and analyzes the performance of the fiber link between the OLT 62 and ONU-1 according to the detected power of uplink optical signals.

Through the above descriptions of the embodiments of the present invention, it can be known that, the test process in the embodiments of the present invention involves no DBA module, waste of bandwidth can be avoided, impact on the work of the ONUs can be prevented, and the process is simple and flexible to implement and highly operable. The above descriptions are merely exemplary embodiments of the present invention, but not intended to limit the protection scope of the present invention. Any modifications, variations or replacement that can be easily derived by those skilled in the art shall fall within the protection scope of the present invention. Therefore, the protection scope of the present invention is subject to the appended claims.

What is claimed is:

1. A method for measuring optical power, applied to a Gigabit Passive Optical Network (GPON) that comprises an Optical Line Terminal (OLT) and multiple Optical Network Units (ONUs), the method comprising:

generating a Physical Layer Operation Administration Maintenance (PLOAM) message which is carried in a PLOAM field of a downstream PLOAM (PLOAMd) overhead area in a downstream frame of a GPON Transmission Convergence layer (GTC), wherein: the PLOAM message includes an identifier of at least one ONU that requires optical power measurement among the multiple ONUs and information about a time bucket for sending upstream optical signals that is allocated to the ONU that requires optical power measurement so that the ONU that requires optical power measurement sends the upstream optical signals to the OLT in the time bucket and other ONUs in the multiple ONUs do not send the upstream optical signals to the OLT in the time bucket;

sending the PLOAM message to the multiple ONUs;

receiving the upstream optical signals that are sent in the allocated time bucket by the ONU that requires optical power measurement, detecting the received upstream optical signals, and determining optical power of the upstream optical signals; and wherein receiving the upstream optical signals that are sent in the allocated time bucket by the ONU that requires optical power measurement comprises:
  determining, according to the information about the time bucket, a receiving interval for receiving the upstream optical signals sent by the ONU that requires optical power measurement, the determining comprising,
    detecting the ONU identifier carried in the received upstream optical signals, and
    if it is detected that the ONU identifier carried in the upstream optical signals matches the identifier of the ONU that requires optical power measurement, determining the start of the receiving interval, and using time length determined according to the information about the time bucket as length of the receiving interval, and
  receiving, in the receiving interval, the upstream optical signals sent by the ONU to be measured.

2. A method for measuring optical power, applied to a Gigabit Passive Optical Network (GPON) that comprises an Optical Line Terminal (OLT) and multiple Optical Network Units (ONUs), the method comprising:

generating a Physical Layer Operation Administration Maintenance (PLOAM) message which is carried in a PLOAM field of a downstream PLOAM (PLOAMd) overhead area in a downstream frame of a GPON Transmission Convergence layer (GTC), wherein: the PLOAM message includes an identifier of at least one ONU that requires optical power measurement among the multiple ONUs and information about a time bucket for sending upstream optical signals that is allocated to the ONU that requires optical power measurement so that the ONU that requires optical power measurement sends the upstream optical signals to the OLT in the time bucket and other ONUs in the multiple ONUs do not send the upstream optical signals to the OLT in the time bucket;

sending the PLOAM message to the multiple ONUs;

receiving the upstream optical signals that are sent in the allocated time bucket by the ONU that requires optical power measurement, detecting the received upstream optical signals, and determining optical power of the upstream optical signals;

wherein generating the PLOAM message comprises:
  allocating to the ONU that requires optical power measurement the time bucket for sending the upstream optical signals, and encapsulating the identifier of the ONU that requires optical power measurement and the information about the time bucket into the PLOAM message;

wherein before allocating to the ONU that requires optical power measurement the time bucket for sending upstream optical signals, the method further comprises:
  obtaining a burst optical power measurement command that includes the identifier of the ONU that requires optical power measurement; and wherein receiving the upstream optical signals that are sent in the allocated time bucket by the ONU that requires optical power measurement comprises:
  determining, according to the information about the time bucket, a receiving interval for receiving the upstream optical signals sent by the ONU that requires optical power measurement, and receiving, in the receiving interval, the upstream optical signals sent by the ONU that requires optical power measurement.

3. An Optical Line Terminal (OLT), comprising:
a Gigabit passive optical network Transmission Convergence layer (GTC) module, configured to: generate a Physical Layer Operation Administration Maintenance (PLOAM) message which is carried in a PLOAM field of a downstream PLOAM overhead area in a GTC downstream frame, wherein: the PLOAM message includes an identifier of at least one Optical Network Unit (ONU) that requires optical power measurement among the multiple ONUs connected to the OLT and information about a time bucket for sending uplink optical signals that is allocated to the ONU that requires optical power measurement so that the ONU that requires optical power measurement sends the uplink optical signals to the OLT in the time bucket and other ONUs in the multiple ONUs do not send the uplink optical signals to the OLT in the time bucket;

a sending module, configured to send the PLOAM message to the multiple ONUs;

a detecting module, configured to: receive the upstream optical signals that are sent in the time bucket by the ONU that requires optical power measurement, detect the received upstream optical signals, and determine optical power of the upstream optical signals;

a power measurement command module, configured to send to the GTC module a burst optical power measurement command that carries the identifier of the ONU that requires optical bower measurement; and wherein the GTC module comprises:
  a time allocating module, configured to allocate to the ONU that requires optical power measurement the time bucket for sending the upstream optical signals, according to the burst optical power measurement command, and
  a PLOAM message encapsulating module, configured to encapsulate the identifier of the ONU that requires optical power measurement and the information about the time bucket into a PLOAM message, wherein the PLOAM message is carried in a downstream PLOAM (PLOAMd) field of a downstream Physical layer Control Block (PCBd) overhead area in a Gigabit Passive Optical Network (GPON) downstream frame.

4. A Passive Optical Network (PON), comprising:
an Optical Line Terminal (OLT) comprising,
  a Gigabit passive optical network Transmission Convergence layer (GTC) module, configured to: generate a Physical Layer Operation Administration Maintenance (PLOAM) message which is carried in a PLOAM field of a downstream PLOAM overhead area in a GTC downstream frame, wherein: the PLOAM message includes an identifier of at least one Optical Network Unit (ONU) that requires optical power measurement among the multiple ONUs connected to the OLT and information about a time bucket for sending uplink optical signals-that is allocated to the ONU that requires optical power measurement so that the ONU that requires optical power measurement sends the uplink optical signals to the OLT in the time bucket and other ONUs in the multiple ONUs do not send the uplink optical signals to the OLT in the time bucket, a sending module, configured to send the PLOAM message to the multiple ONUs, and a detecting module, configured to: receive the upstream optical signals that are sent in the time bucket by the ONU that requires optical power measurement, detect the received upstream optical signals, and determine optical power of the upstream optical signals;

multiple Optical Network Units (ONUs), each ONU comprising, a Gigabit passive optical network Transmission Convergence layer (GTC) module, a control module, and an optical module, wherein:

the multiple ONUs are connected to the OLT through an Optical Distribution Network (ODN);

the OLT sends a Physical Layer Operation Administration Maintenance (PLOAM) message to the multiple ONUs through the ODN; the PLOAM message is carried in a downstream PLOAM (PLOAMd) field in a Gigabit Passive Optical Network (GPON) downstream frame; the PLOAM message carries an identifier of at least one ONU that requires optical power measurement and information about a time bucket for sending upstream optical signals that is allocated to the ONU that requires optical power measurement so that the ONU that requires optical power measurement sends the upstream optical signals to the OLT in the time bucket and other ONUs in the multiple ONUs do not send the upstream optical signals to the OLT in the time bucket;

the OLT is further configured to receive the upstream optical signals that are sent, according to the time bucket information in the PLOAM message, by the ONU that requires optical power measurement, detect the received upstream optical signals, and determine optical power of the upstream optical signals; and each ONU in the multiple ONUs is configured to: receive and parse the PLOAM message from the OLT, obtain the identifier of the ONU that requires optical power measurement and the information about the time bucket that is allocated to the ONU that requires optical power measurement and is used for sending the upstream optical signals, determine whether the identifier of the ONU that requires optical power measurement matches the identifier of the ONU, send the upstream optical signals to the OLT in the time bucket if the identifier of the ONU that requires optical power measurement matches the identifier of the ONU, or send no upstream optical signal to the OLT in the time bucket if the identifier of the ONU that requires optical power measurement does not match the identifier of the ONU.

5. The PON according to claim 4, wherein each control module is configured to judge whether its own identifier matches the identifier of the ONU that requires optical power measurement; control the optical module to send the upstream optical signals in the time bucket if its own identifier matches the identifier of the ONU that requires optical power measurement, or send no upstream optical signal in the time bucket if its own identifier does not match the identifier of the ONU that requires optical power measurement.

* * * * *